United States Patent Office 3,245,924
Patented Apr. 12, 1966

3,245,924
POLYURETHANE COMPOSITIONS
Eugene F. Cox, Charleston, William H. Cook, South Charleston, and Fritz Hostettler, Charleston, W. Va., assignors to Union Carbide Corporation, a corporation of New York
No Drawing. Filed May 1, 1962, Ser. No. 191,425
9 Claims. (Cl. 260—2.5)

This application is a continuation-in-part of application Serial No. 143,580, filed on October 9, 1961, in the names of Eugene F. Cox, William H. Cook, and Fritz Hostettler, now U.S. Patent No. 3,186,969.

The invention relates to polyurethane compositions. In one aspect, the invention relates to polyurethane compositions which comprise the reaction product of an organic polyisocyanate and a polyol which comprises a vicinal epoxide adduct of a phenol-aromatic amine-aldehyde condensation product. In another aspect, the invention relates to plastic foams which comprise the foamed reaction product of an organic polyisocyanate and a polyol which comprises a vicinal epoxide adduct of a phenol-aromatic amine-aldehyde condensation product. In still another aspect, the invention relates to plastic foams which comprise the foamed reaction product of an organic polyisocyanate and a mixture of polyols containing a vicinal epoxide adduct of a phenol-aromatic amine-aldehyde condensation product and one or more additional polyols which are described hereinbelow.

The polyurethane compositions of the invention are useful in the plastic arts, for example, in the preparation of surface coatings, flexible, semi-flexible, and rigid foams, and the like. The rigid foams are useful in the preparation of sandwich panels, insulating applications in home refrigerators and freezers, refrigerated trucks and other carriers, and the like. The semi-flexible foams of the invention are useful in preparing automobile crash pads, weather stripping, and the like, and the flexible foams are useful for preparing cushions, furniture padding, and the like.

Broadly, the polyurethanes provided by the invention comprise the reaction product of an organic polyisocyanate and a polyol which comprises a vicinal epoxide adduct of the condensation product of (a) a phenol which has at least one unsubstituted reactive position on the aromatic nucleus; (b) an aromatic amine which has the formula ArNHR wherein Ar represents an aryl radical that has at least one unsubstituted reactive position on the aromatic nucleus, and wherein R represents a hydrogen or an alkyl group, and (c) an aldehyde.

The polyol portion of the formulation for producing the polyurethanes of the invention can also include one or more additional polyols, for example, one or more compositions selected from the following classes:

(a) Polyhydroxyalkanes,
(b) Trialkanolamines,
(c) Polyols derived from mono- and polyamines by addition of alkylene oxides,
(d) Polyoxyalkylene glycols,
(e) Alkylene oxide adducts of polyphenols,
(f) Alkylene oxide adducts of non-reducing sugars and sugar derivatives,
(g) Alkylene oxide adducts of polyhydroxyalkanes, and the like.

The organic polyisocyanates which are employed to prepare the polyurethanes of the invention include, for example, 2,4- and 2,6-tolylene diisocyanate, durylene diisocyanate, bis(4-isocyanatophenyl)methane, 4,4',4''-tris(isocyanatophenyl)methane, hexamethylene diisocyanate, xylylene diisocyanates, 3,10-diisocyanatotricyclo[5,2,1, 0$^{2,6}$]decane and polyisocyanates listed in the publication of Siefken, Annalen 562, pages 122–135 (1949). Further polyisocyanates of particular interest are those obtained by reacting aromatic amines with formaldehyde and phosgenation of the resulting condensation products as set forth in U.S. Patents 2,683,730 and 3,012,008. The preferred organic polyisocyanates are the tolylene diisocyanates.

It is also within the scope of the invention to use polyisocyanate dimers or trimers of the above-mentioned polyisocyanates. Such products can be prepared separately by procedures known in the art or they can be formed in situ during the polymerization reaction of the polyisocyanate with the polyol by proper choice of catalysts known to catalyze dimerization or trimerization, e.g., potassium laurate.

A major point of novelty of the present invention resides in the use of the polyols which comprise the vicinal epoxide adducts of phenol-aromatic amine-aldehyde condensation products to produce the polyurethane compositions of the invention. These polyols are prepared by reacting one or more vicinal epoxides with a phenol-aromatic amine-aldehyde condensation product employed as a starter, under conditions fully described hereinbelow at a more appropriate section of the specification, and recovering the polyol thereby produced.

The phenol-aromatic amine-aldehyde condensation products employed as starters in the production of these polyols are prepared by the reaction of a phenol, an aromatic amine, and an aldehyde. This ternary condensation reaction can apparently proceed by several routes, one of which is the initial reaction of the aldehyde with the aromatic amine to produce an N-(1-hydroxyalkyl) aromatic amine, which in turn condenses with the phenol. This product then rearranges to form an aminoarylhydroxyarylalkane. The following sequence of reactions between formaldehyde, aniline, and phenol, is illustrative:

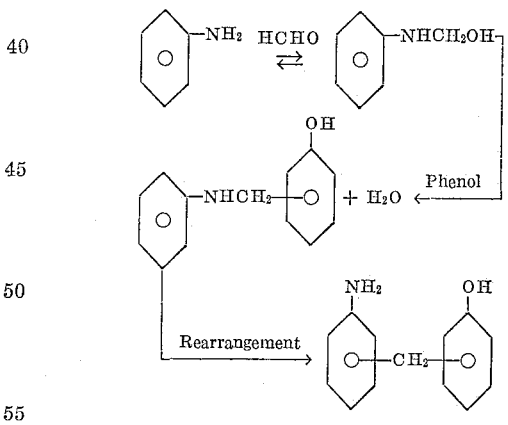

The amino group is thus freed to react with additional formaldehyde, and the sequence of reactions is continued. By proper adjustment of the reaction conditions, the molecular structure of the condensation products can be controlled within readily reproducible limits, which permits a high degree of batch-to-batch uniformity. Whereas in the preferred embodiment of the present invention the above-described condensation reaction is conducted in the absence of a catalyst, it is within the scope of the invention to perform said condensation reaction in the presence of an acidic or a basic catalyst if desired.

The phenols which can be employed to produce the condensation products are the phenols which have at least one unsubstituted reactive position on the aromatic nucleus. It is normally the case that the reactive positions on the aromatic nucleus are those which are ortho or para, and preferably ortho, to the hydroxyl group. Therefore, phenols which have at least one unsubstituted position ortho or para to the hydroxyl group can be used, but if only one unsubstituted reactive position is present, it is preferred that said reactive position be ortho to the phenolic hydroxyl group. The phenols which can be employed include, among others, phenol, the alkylphenols, the halophenols, the alkoxyphenols, the aminophenols, the dialkylaminophenols, the dihydroxybenzenes, the napthols, and the like, which have at least one unsubstituted reactive position on the aromatic nucleus. Specific examples of phenols which can be employed include, among others, phenol, o-, m-, and p-cresol, o-, m-, and p-ethylphenol, o-, m-, and p-propylphenol, para-t-butylphenol and other butylphenols, the pentylphenols, the hexylphenols, the heptylphenols, the octylphenols, the nonylphenols, the decylphenols, the dodecylphenols, the pentadecylphenols, the octadecylphenols, the dimethylphenols, the diethylphenols, the dipropylphenols, the dibutylphenols, cresylic acids and other mixtures of alkylphenols, para-aminophenol, chlorophenols, certain dichlorophenols, the bromophenols, o-, m-, and p-methoxyphenol, o-, m-, and p-ethoxyphenol, o-, m-, and p-butoxyphenol, o-, m-, and p-N,N-dimethylaminophenol, resorcinol, catechol, phloroglucinol and other trihydroxybenzenes, naphthols, dihydroxynaphthalenes, 2,2-bis(para-hydroxyphenyl)propane, bis(para - hydroxyphenyl)sulfone, and other bisphenols, aminophenols, trihydroxyphenyl and other hydroxybiphenyls, and the like. The preferred phenols are those which can be represented by the formula

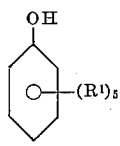

wherein each $R^1$ individually represents hydrogen, alkyl, preferably having not more than 18 carbon atoms and more preferably not more than 10 carbon atoms, hydroxyl, amino, chloro, alkylamino or dialkylamino wherein preferably the alkyl groups thereof have not more than 18 carbon atoms and more preferably not more than 10 carbon atoms, provided that at least one $R^1$ is a hydrogen that is bonded to a reactive position on the aromatic nucleus. The most preferred phenols are phenol, the alkylphenols, meta and para aminophenols, and the monochlorophenols.

The aromatic amines which can be employed are those which are represented by the formula ArNHR wherein Ar is an aryl group which has at least one unsubstituted reactive position on the aromatic nucleus, and wherein R represents a hydrogen or an alkyl. Ordinarily, the reactive positoins are those which are ortho and para to the amino group. Accordingly, aromatic amines which have at least one unsubstituted position ortho or para to the amino group are highly desirable for use in preparing the condensation products employed in the invention. Among the aromatic amines which can be employed are aniline, the aminophenols, benzenediamines, alkyl-substituted anilines, alkyl-substituted benzenediamines, N-alkyl-substituted anilines, the napthylamines, N-alkyl-aminoanilines, the haloanilines, and the like. Specific examples of aromatic amines which can be employed include, among others, aniline; m-, and p- benzenediamine; o-, m-, and p-toluidine; o-, m-, and p-ethylaniline; o-, m-, and p-butylaniline; 2,3-xylidine and other xylidines; 2,4-and 2,6-diaminotoluene and certain other diaminotoluenes; 1-ethyl-2,4-diaminobenzene; 1-propyl-2,4-diaminobenzene; 1-butyl-2,4-diaminobenzene; o- and p-diethylaminoaniline; o- and p-dimethylaminoaniline; alpha-naphthylamine and other mono- and polyaminonaphthalenes; para-aminophenol and other aminophenols; o-chloroaniline and other chloroanilines and bromoanilines; aromatic amine/formaldehyde condensation products such as diaminodiphenylmethanes, triaminotriphenylmethanes, and the like; bis(aminophenyl)sulfones such as bis(4-aminophenyl)sulfone, and the like; N-alkylanilines such as N-methylaniline, N-ethylaniline and higher N-alkylanilines, N-methyltoluidines, and all of the aromatic amines enumerated above having N-alkyl substituents, but containing at least 1 amino hydrogen, and the like. The preferred aromatic amines are those which can be represented by the formula

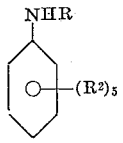

wherein R represents hydrogen or alkyl, preferably of not more than 4 carbon atoms, and wherein each $R^2$ individually represents a hydrogen, amino, alkylamino or dialkylamino wherein the alkyl groups thereof preferably have not more than 18 carbon atoms and more preferably not more than 10 carbon atoms, or hydroxyl, provided that at least one $R^2$ represents a hydrogen that is bonded to a reactive position on the aromatic nucleus. The most preferred amines are aniline, the alkyl-substituted anilines, and the alkyl-substituted m-diaminobenzenes.

The aldehydes which can be employed include, among others, formaldehyde, acetaldehyde, propionaldehyde, chloral, and the like. Formaldehyde is preferred. The aldehyde can be employed in water solution or in an organic solvent. It is preferred to employed the formaldehyde in solution in methanol or as the 37 weight percent aqueous solution known as formalin.

The portion of the reactants employed to prepare the phenol-aromatic amine-aldehyde condensation products can be varied over a wide range. For example, for phenol and aniline themselves, the phenol-aromatic amine molar ratio can be varied from about 15:1, and higher, to about 1:15, and lower. A desirable molar ratio of phenol-aromatic amine is between about 9:1 and 1:9. The preferred molar ratio of phenol-aromatic amine is in the range of from about 6:1 to about 1:6, and most preferably, from about 3:1 to about 1:3. When substituted and polyfunctional phenols and aromatic amines are employed, the ratios may vary somewhat from those indicated above. The molar ratio of (phenol+aromatic amine):aldehyde can be varied from about 20:1, and higher, to about 1:1, and lower. The preferred molar ratio of (phenol+aromatic amine):aldehyde is from about 6:1 to about 1.2:1, and most preferably, from about 4:1 to about 1.4:1. Again, when substituted and polyfunctional phenols and aromatic amines are employed, the ratio may vary somewhat from those indicated.

The preferred phenol-aromatic amine-aldehyde condensation products are those which are permanently fusible. The preparation of the permanently fusible condensation products is dependent chiefly upon the amount of aldehyde employed. As a guide, it has been found that when the molar ratio of (phenol+aromatic amine):aldehyde is smaller than about 1.2:1, it becomes increasingly difficult to avoid residual reactivity which promotes crosslinking of the condensation products. Although the condensation products which are crosslinked, i.e., not permanently fusible, can be employed in the invention, the processing advantages attendant with the use of a permanently fusible condensation product are apparent, and for that reason, the permanently fusible condensation products are preferred.

The preferred method for carrying out the condensation reaction is to add the aldehyde slowly to an agitated mixture of phenol and aromatic amine, said mixture being maintained at a temperature of from about 0° C., lower, to about 200° C., and higher, and preferably from about 60° C. to about 180° C., during the addition. After the addition of aldehyde, which can take from about 30 minutes to about 20 hours longer, the reaction mixture is maintained at or above the temperature at which the aldehyde was charged for up to about 2 hours. At the end of the reaction period, the condensation product can then be recovered by stripping off water, unreacted reagents, and any solvents that may be present, by heating to about 160° C.–200° C. and thereafter reducing the pressure.

Conventional equipment can be employed for the condensation reaction. For example, a reaction kettle equipped with agitator, means for reflux and distillation, nitrogen inlet means, and conventional heat transfer means, is suitable. The material of construction can be steel, stainless steel, glass, monel, and the like.

The condensation products described above are employed as "starters" to produce polyols by reacting said condensation products with one or more vicinal epoxides. The vicinal epoxides which can be employed include, for example, the alkylene oxides, the aryl glycidyl ethers, the aryl-substituted alkylene oxides, the cycloalkylene oxides, the halogen-substituted alkylene oxides, and the like, which preferably have from 2 to 10 carbon atoms and which have one vicinal epoxide group per molecule. Specific examples of vicinal epoxides which can be employed include, among others, ethylene oxide; 1,2-epoxypropane; 1,2-epoxybutane; 2,3-epoxybutanes; 2-methyl-1,2-epoxypropane, the epoxypentanes; the epoxyhexanes; the epoxyheptanes; the epoxyoctanes; the epoxydecanes; phenyl glycidyl ether; tolyl glycidyl ether; ethylphenyl glycidyl ether; propylphenyl glycidyl ether; butylphenyl glycidyl ether; styrene oxide; 1,2-epoxycyclohexane; 1,2-epoxycyclopentane; 2,3-epoxybicyclo[2,2,1]heptane; 4-chloro-1,2-epoxybutane; and the like. The preferred vicinal epoxides are the alkylene oxides such as ethylene oxide, 1,2-epoxypropane, and the epoxybutanes.

The polyols under consideration are prepared by reacting a vicinal epoxide with a phenol-aromatic amine-aldehyde condensation product. The epoxide reacts with the phenolic hydroxyl groups and with the primary or secondary amino groups which are present in the condensation product, to form substituted or unsubstituted oxyalkylene chains of varying lengths, wherein each chain is connected to the condensation product through a phenolic oxygen atom or through an aromatic amino nitrogen atom at one end, and wherein each chain is terminated by a hydroxyl group at the other end. The addition reaction can be carried out in an inert organic vehicle, but is preferably carried out by slowly adding the epoxide to an agitated batch of fused phenol-aromatic amine-aldehyde condensation product. The reaction temperature can vary over a wide range, for example, from about 80° C. to about 220° C., and preferably from about 130° C. to about 190° C. The reaction time is dependent, in part, upon several factors, such as temperature, nature and proportion of reagents, and the like. Therefore, the reaction time can vary over a wide range, for example, from about 30 minutes to about 20 hours, and longer, and preferably from about 1 hour to about 10 hours. A limited amount of vicinal epoxide will add to some of the phenolic hydroxyl groups of the condensation products without employing a catalyst. Although it varies with the nature of the particular reagents employed, up to about 1.0 mole of vicinal epoxide per equivalent of phenolic hydroxyl groups contained in the condensation product will add without the use of a catalyst. Additional vicinal epoxide can then be added by employed a catalyst, for example, alkali metal and alkaline earth metal hydroxides or alkoxides such as sodium hydroxide, potassium hydroxide, calcium hydroxide, barium hydroxide, sodium methoxide; tertiary aliphatic amines such as trimethylamine; and proton acids and Lewis acids. The catalyst is employed in an amount of from about 0.02 weight percent to about 1.0 weight percent or more, and preferably from about 0.05 to about 0.2 weight percent, based on total weight of reactants.

The proportion of the vicinal epoxide and the phenol-aromatic amine-aldehyde condensation product can vary widely. The amount of vicinal epoxide employed depends upon the length of the oxyalkylene chains that it is desired to build up. The chain length can be tailor-made, depending upon the particular type of urethane product which is to be prepared from the polyol. The polyols can have oxyalkylene chains which average from about 1.0, and lower, to about 30, and higher, oxyalkylene units per reactive hydrogen atoms contained in the phenol-aromatic amine-aldehyde condensation product. (The reactive hydrogens are the phenolic hydroxyl hydrogens and the aromatic amino hydrogens.) Such products are within a hydroxyl number range of from about 40 to about 900.

Within these limits it can be stated that the preferred polyols for the preparation of rigid foams or hard coatings have oxyalkylene chains which average from about 1.5 to about 2.5 oxyalkylene units per reactive hydrogen atom. The preferred polyols for the production of semi-flexible foams and coatings have oxyalkylene chains which average from about 2.5 to about 10 or more oxyalkylene units, and the preferred polyols for the production of flexible foams and coatings have oxyalkylene chains which average from about 15 to about 30 oxyalkylene units.

After the reaction of vicinal epoxide with phenol-aromatic amine-aldehyde condensation product, the polyol products can be recovered by conventional methods. For example, a suitable method of recovery is to dilute the polyol with an inert organic vehicle, for example methanol or 2-propanol, and to pass the diluted polyol through an ion exchange resin to remove any catalyst that was employed for the epoxide addition reaction. The inert organic vehicle can then be stripped off, along with any unreacted epoxide that might be present, thereby recovering the polyol product.

Conventional reaction equipment can be employed for the epoxide addition reaction. If desired, the same equipment employed for the preparation of the phenol-aromatic amine-aldehyde condensation product can be utilized for the epoxide addition reaction. The pressure under which the reaction is conducted is not critical, and it can be atmospheric, subatmospheric, or superatmospheric.

The formulation for producing the polyurethane compositions of the invention can also include one or more additional polyols, for example, one or more polyols from the following classes of compositions: polyhydroxyalkanes, trialkanol-amines, polyols derived from mono- and polyamines by the addition of alkylene oxides, polyalkylene glycols, alkylene oxide adducts of polyphenols, alkylene oxide adducts of non-reducing sugars and sugar derivatives, alkylene oxide adducts of polyhydroxyalkanes, and the like.

Illustrative polyhydroxyalkanes include, among others, ethylene glycol, propylene glycol, 1,3-dihydroxybutane, 1,4-dihydroxybutane, glycerol, 1,2,4-trihydroxybutane, 1,2,6-trihydroxyhexane, 1,1,1-trimethylolethane, 1,1,1-trimethylolpropane, sorbitol, and the like.

The trialkanolamines contemplated are compounds such as triethanolamine, triisopropanolamine, the tributanolamines, and the like, wherein the alkanol moieties preferably have from 2 to 4 carbon atoms.

Alkylene oxide adducts of mono- and polyamines are useful coreactants in the compositions of the invention. The mono- and polyamines are preferably reacted with alkylene oxides having from 2 to 4 carbon atoms, i.e., ethylene oxide, 1,2-epoxypropane, or the epoxybutanes. Mono- and polyamines suitable for reaction with alkylene oxides include, among others, methylamine, ethylamine, isopropylamine, butylamine, benzylamine, aniline, the toluidines, monochloroanilines, 3,4-dichloroaniline, naphthylamines, ethylenediamine, diethylenetriamine, triethylenetetramine, 1,3-butanediamine, 1,3-propanediamine, 1,4-butanediamine, 1,6-hexanediamine, phenylenediamines, toluenediamine, naphthalenediamines, and the like. Among the compounds of the above groups which are of particular interest are, for example, N,N,N',N'-tetrakis (2-hydroxyethyl)ethylenediamine, N,N,N',N' - tetrakis(2- hydroxypropyl)ethylenediamine, N,N,N',N",N"-pentakis (2 - hydroxypropyl)diethylenetriamine, phenyldiisopropanolamine and higher alkylene oxide adducts of aniline, and the like.

A further class of polyols which are contemplated are the polyoxyalkylene glycols, for example, diethylene glycol, triethylene glycol, tetraethylene glycol, high molecular weight polyethylene glycols, dipropylene glycol, tripropylene glycol, tetrapropylene glycol, high molecular weight polypropylene glycols, dibutylene glycol, mixed ethylene/propylene glycols and mixed polyethylene/polypropylene glycols, and the like.

Illustrative among alkylene oxide adducts of polyphenols are, among others, alkylene oxide adducts of 2,2-bis(para - hydroxyphenyl)propane, bis(para - hydroxyphenyl)methane, condensation products of phenol and formaldehyde, more particularly the novolac resins, condensation products of various phenolic compounds and acrolein, the simplest members of this class being the 1,1,3 - tris(hydroxyphenyl)propanes, condensation products of various phenolic compounds and glyoxal, glutaraldehyde, and other dialdehydes, the simplest members of this class being the 1,1,2,2-tetrakis(hydroxyphenyl)ethanes, and the like. Within the above class of compounds the preferred alkylene oxide adducts are those prepared from alkylene oxides having from 2 to 4 carbon atoms.

The alkylene oxide adducts of non-reducing sugars and sugar derivatives which can be employed include, for example, the ethylene oxide, 1,2-epoxypropane, and epoxybutane, and mixtures thereof, adducts of sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like.

A still further class of polyols which can be employed are the alkylene oxide adducts of polyhydroxyalkanes. The alkylene oxides employed are preferably those which have from 2 to 4 carbon atoms, for example, ethylene oxide, 1,2-epoxypropane, 1,2-epoxybutane, and the like. The polyhydroxyalkanes employed are preferably those which have from 2 to 6 carbon atoms and from 2 to 6 hydroxyl groups, for example, ethylene glycol, 1,2-dihydroxypropane, 1,2-dihydroxybutane, glycerol, 1,2,6-trihydroxyhexane, 1,1,1-trimethylolethane, 1,1,1-trimethylolpropane, pentaerythritol, sorbitol, and the like. One particularly desirable polyol is the 1,2-epoxypropane adduct of a mixture containing a major amount of sorbitol (for example, up to about 95–98 weight percent of said mixture being sorbitol) and a minor amount of water, the components being reacted in such proportions that the resulting adduct has a hydroxyl number of from 200 to about 700, and preferably from about 400 to about 550. The adduct consists essentially of polypropylene glycol and the propylene oxide adduct of sorbitol.

The polyol portion of the formulation for preparing the polyurethanes of the invention can be a mixture containing from about 5, and lower, to 100 weight percent, based on weight of said mixture, of the vicinal epoxide adduct of the phenol-aromatic amine-aldehyde condensation product described hereinabove, and from 0 to about 95, and higher, weight percent, based on weight of said mixture, of one or more other polyols, for example, one or more of the polyols enumerated in the preceding paragraphs.

The exact composition of the above-mentioned polyol combinations depends upon the end-use of the urethane reaciton product. For example, in the case of foamed reaction products, the molecular weight or the hydroxyl number is selected properly to result in flexible, semi-flexible, or rigid foams. The general hydroxyl number limits for such end-uses for the vicinal epoxide adducts of phenol-aromatic amine-aldehyde condensation products were described hereinabove. The hydroxyl numbers of the above-exemplified polyols which can be used in conjunction with the phenol-aromatic amine-aldehyde condensation products in the preparation of foams depend upon the type of foamed product desired. For example, the above polyols preferably possess a hydroxyl number of from about 200 to about 1000 when employed in rigid foam formulations, from about 50 to about 150 for semi-flexible foam formulations, and from about 40 to about 70 or more when employed in flexible foam formulations. Such limits are not intended to be restrictive, but are merely illustrative of the large number of possible combinations of the above polyol coreactants.

Often, the above-exemplified polyols when used in conjunction with the vicinal epoxide adducts of the phenol-aromatic amine-aldehyde condensation products will have other beneficial effects such as improvement of dimensional properties of foamed products, more desirable handling characteristics of the polyol mixture, and the like. For example, in the case of a rigid foam formulation, the alkylene oxide adduct of a phenol-aromatic amine-aldehyde condensation product employed would preferably have a hydroxyl number of about 280 to about 350. Such products have high viscosity and are difficult to handle in conventional foam machinery. Consequently, the use of reactive viscosity diluents such as polyhydroxyalkanes, certain low molecular weight alkylene oxide adducts thereof, or other low molecular weight polyols, for example, one or more of the polyols exemplified above, is often desirable to facilitate handling. In the case of semi-flexible foams such as those used for automobile crash pads, it is often desirable to employ smaller amounts, for example, up to about 30 weight percent of the polyol mixture, of an alkylene oxide adduct of a phenol-aromatic amine-aldehyde condensation product having a hydroxyl number of, for example, 280 to 350, in admixture with an alkylene oxide adduct of a polyhydroxyalkane such as glycerol, the last said adduct having a hydroxyl number of from about 45 to 60.

Other modifications of possible polyol combinations will be readily apparent to those having ordinary skill in the art.

The hydroxyl number, as used hereinabove, is defined by the equation $$OH = \frac{f \times 1000 \times 56.1}{M.W.}$$

wherein

OH = hydroxyl number of the polyol,
$f$ = functionality (that is, average number of hydroxyl groups per molecule of polyol),
M.W. = molecular weight of the polyol.

The amount of organic polyisocyanate employed is dependent, in part, upon such factors as the nature of the reactants, the nature of the end-use for the polyurethane product, and the like. In general, however, the total isocyanate equivalent to total reactive hydrogen equivalent (i.e., total equivalent of alcoholic hydroxyl plus water, if water is employed in the formulation) is ordinarily such as to provide enough isocyanate equivalents to react with all reactive hydrogen equivalents present. Preferably, the ratio of isocyanate equivalents to reactive hydrogen equivalents is about 1.0 to 1.1 —NCO equivalents per reactive hydrogen equivalent.

When preparing surface coatings, the quasi-prepolymer or prepolymer technique is ordinarily employed. When preparing foamed products, either the quasi-prepolymer technique or the one-shot technique can be employed. Both techniques are known in the art.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-hydroxyl reaction, or by a combination of the two methods. All of these methods are known in the art. The preferred blowing agents are certain halogen-substituted aliphatic hydrocarbons which have boiling points between about —40° C. and 70° C., and which vaporize at or below the temperature of the foaming mass. These blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1,1,1-trifluoro-2-chloroethane, 1-chloro-1-fluoroethane, 1-chloro-2-fluoroethane, 1,1,1-trichloro-2,2,2-trifluoroethane, 1,1,2-trichloro-1,2,2-trifluoroethane, 2-chloro-1,1,1,2,3,3,4,4,4-nonafluorobutane, hexafluorocyclobutene and octafluorocyclobutane. Other useful blowing agents include low-boiling hydrocarbons such as butane, pentane, hexane, cyclohexane, and the like. Many other compounds easily volatilized by the exotherm of the isocyanate-hydroxyl reaction also can be employed. A further class of blowing agents includes thermally-unstable compounds which liberate gases upon heating, such as N,N'-dimethyl-N,N'-dinitrosoterephthalamide.

The amount of blowing agent used will vary with the density desired in the foamed product. In general it may be stated that for 100 grams of reaction mixture containing an average NCO/OH ratio of about 1:1, about 0.005 to 0.3 mole of gas are used to provide densities ranging from 30 to 1 pounds per cubic foot respectively.

Catalysts can be employed in the reaction mixture for accelerating the isocyanate-hydroxyl reaction. Such catalysts include a wide variety of compounds such as, for example:

(a) Tertiary amines such as trimethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo-[2,2,2]octane, and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine, and the like, with various metals such as Be, Mg, Zn, Cd, Pb, Ti, Zr, Sn, Sb, As, Bi, Cr, Mo, Mn, Fe, Co, Ni, or such ions as $MoO_2^{++}$, $UO_2^{++}$, and the like;

(f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)alkanols, such as the well known chelates of titanium obtained by said or equivalent procedures;

(g) Salts of organic acids with a variety of metals such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) Organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-dimethylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-diethylaminopentylate), dibutyltin dichloride, dioctyltin dichloride, and the like.

The tertiary amines may be used as primary catalysts for accelerating the reactive hydrogen-isocyanate reaction or as secondary catalysts in combination with the above noted metal catalysts. Metal catalysts, or combinations of metal catalysts, may also be employed as the accelerating agents, without the use of amines. The catalysts are employed in small amounts, for example, from about 0.001 percent to about 5 percent, based on weight of the reaction mixture.

It is also within the scope of the invention to employ small amounts, e.g., about 0.001 percent to 5.0 percent by weight, based on the total reaction mixture, of an emulsifying agent such as a siloxane-oxyalkylene block copolymer having from about 10 to 80 percent by weight of siloxane polymer and from 90 to 20 percent by weight of alkylene oxide polymer, such as the block copolymers described in U.S. Patents 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. The copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Although the use of an emulsifier is desirable to influence the type of foam structure that is formed, the foam products of the invention can be prepared without emulsifiers.

The following examples illustrate the practice of the present invention:

EXAMPLE 1

*Preparation of phenol-aromatic amine-formaldehyde condensation product*

A mixture of 1000 grams (10.62 moles) of phenol and 990 grams (10.62 moles) of aniline was heated to 95° C. under a nitrogen atmosphere in a 5000 milliliter, 4-neck Pyrex reaction flask that was equipped with stirrer, thermometer, dropping funnel, and reflux condenser. Over a 45-minute period, 1105 grams (11.8 moles) of 37 weight percent aqueous formaldehyde solution was added to the reaction mixture while stirring vigorously. A mild exotherm occurred during the addition of formaldehyde. The reaction mixture was refluxed for one hour at about 102° C., and was then distilled to a pot temperature of 180° C. at atmospheric pressure. These conditions were maintained for 30 minutes, after which time the pressure was reduced to an absolute pressure of 3 millimeters of mercury. The distillation was continued for ten minutes at 3 millimeters of mercury pressure and 180° C. The resulting condensation product was a clear, brittle, glass-like solid at room temperature. The distillate had two phases and contained only water, phenol, aniline, and a trace of formaldehyde.

The following analytical procedures and calculations were employed to characterize the condensation products and the vicinal epoxide adducts prepared therefrom:

Conversion of starting materials to condensation product, per batch =

$$\frac{\text{Weight of condensation product}}{\text{Total weight of starting materials}}$$

Amino+phenoxyl equivalent weight=Analogous to hydroxyl number determination (acetic anhydride in pyridine, 30 minutes at room temperature)

Average molecular weight="Thermometric" method, in acetone, ethanol, or chloroform Active hydrogen equivalent weight=

$$\frac{(\text{OH equivalent weight of epoxide adduct}) (\text{weight of condensation product})}{\text{Weight of epoxide adduct}}$$

Basic nitrogen analysis=Titration with perchloric acid in glacial acetic acid

Average active hydrogen functionality=

$$\frac{\left[\frac{\text{M.W. of condensation product}}{\text{}} + 12\right]\left[2\left(\frac{\text{ArNH}_2}{\text{ArOH}}\text{ratio}\right) + 1\right]}{\left(\frac{\text{ArNH}_2}{\text{ArOH}}\text{ratio}\right)(12 + \text{M.W. ArNH}_2) + (\text{M.W. ArOH} + 12)}$$

(This formula applicable only when condensation product is prepared from monohydric phenols and monoamine aromatic amines.)

Average polyether chain length=

$$\frac{(\text{OH equivalent weight of epoxide adduct}) - (\text{active H equivalent weight of condensation product})}{\text{Molecular weight of epoxide}}$$

EXAMPLES 2–11

Following the same general procedure described in Example 1, a series of condensation products was prepared from phenol, aniline, and formaldehyde. Table I below, describes each condensation product and reports the analytical results obtained for each example.

TABLE I.—ANALYTICAL RESULTS: CONDENSATION PRODUCTS OF PHENOL, ANILINE, FORMALDEHYDE

| Example | 1 | 2 | 3 | 4 | 5 | 6 | 7 | 8 | 9 | 10 | 11 |
|---|---|---|---|---|---|---|---|---|---|---|---|
| Molar ratio of reactants phenol/aniline/formaldehyde | 1/1/1.28 | 1/1/1.3 | 2/1/1.25 | 8/8/1 | 8/1/2 | 8/13 | 1/8/2 | 3/3/1 | 2/2/1 | 1.3/1.3/1 | 1/1/1 |
| Percent conversion of starting materials to condensation product, per batch | 55 | 56 | | 12.5 | 36 | 35 | 25 | 27 | 35 | 46 | 45 |
| Active hydrogen, equivalent weight | 67.2 | 67.8 | 71.3 | 68.2 | 81.8 | 81.3 | 63.5 | 63.6 | 67.7 | 62.6 | 60.5 |
| Equivalent weight, amino plus phenoxyl groups | 108.8 | 117.8 | 105.8 | 99.8 | 111.4 | 114.7 | 106.9 | 99.7 | 101.8 | 101.1 | 102.1 |
| Ratio, aniline residues per phenol residue | 1.08 | 0.994 | 0.899 | 1.02 | 0.433 | 0.396 | 1.80 | 1.05 | 1.15 | 1.28 | 1.12 |
| Basic nitrogen, weight percent | 6.68 | 5.93 | 6.27 | 7.07 | 3.80 | 3.47 | 8.43 | 7.19 | 7.37 | 7.79 | 7.24 |
| Total nitrogen, weight percent | 6.85 | 5.75 | 6.30 | 6.70 | 3.98 | 3.46 | 8.01 | 7.05 | 7.39 | 7.84 | 7.13 |
| Molecular weight of condensation product | 491 | 474 | 335 | 200 | 361 | 450 | 496 | 255 | 284 | 327 | 371 |
| Average active hydrogen functionality | 7.2 | 6.9 | 4.8 | 3.0 | 4.6 | 5.6 | 7.9 | 3.8 | 4.3 | 5.0 | 5.5 |

Ratio, aniline residues per phenol residues in condensation product=

$$\frac{(\text{Percent N}) (\text{amino+phenoxyl equivalent weight})}{1401 - (\text{percent N}) (\text{amino+phenoxyl equivalent weight})}$$

(This formula is employed only when monohydric phenols and monoamino aromatic amines are employed.)

EXAMPLES 12–21

In these experiments, various phenols and aromatic amines were employed to prepare condensation products by the same general procedure described in Example 1. Table II identifies the nature and proportion of the reagents employed in each example, and Table III details the analytical results obtained for each example.

TABLE II.—IDENTIFICATION OF PHENOL-AROMATIC AMINE FORMALDEHYDE CONDENSATION PRODUCTS

| Example | 12 | 13 | 14 | 15 | 16 | 17 | 18 | 19 | 20 | 21 |
|---|---|---|---|---|---|---|---|---|---|---|
| Molar ratio of phenol/aromatic amine/formaldehyde | 1/6/2 | 6/1/2 | 1/1/1.3 | 1/4.5/1.5 | 5/1/1 | 1/1/1 | 1/1/1 | 1/1/1 | 2/1 [2] | 1/1/1. |
| Identification of phenol. | Koppers [1] Type BC cresylic acid. | Koppers [1] Type BC cresylic acid. | Koppers [1] Type BC cresylic acid. | Para-chlorophenol. | Phenol | Phenol | Phenol | Para-t-butylphenol. | Para-aminophenol. | Phenol. |
| Identification of aromatic amine. | Aniline | Aniline | Aniline | Aniline | 2,4-diaminotoluene. | o-Toluidine. | p-Toluidine. | p-Toluidine. | Para-aminophenol. | N-methyl aniline. |

[1] A mixture of $C_1$–$C_3$ alkyl-substituted phenols having an average molecular weight of 112, and having the following analysis:

Vapor phase analysis, weight percent:
```
"Light Ends"                                            0
Phenol                                                  4.8
o-Cresol plus 2,6-xylenol                              10.9
m-, p-cresol plus o-ethylphenol                        46.9
2,4- and 2,5-xylenol                                   16.0
3,5- and 2,3-xylenol plus m-, p-ethylphenol            14.6
2,3,5-trimethylphenol                                   2.0
3,4-xylenol plus m-, p-isopropylphenol                  4.7
2,4,6-trimethylphenol plus o-isopropylphenol            0
```

[2] The reaction mixture contained 2 moles of para-aminophenol per mole of formaldehyde.

TABLE III.—ANALYTICAL RESULTS: PHENOL-AROMATIC AMINE-FORMALDEHYDE CONDENSATION PRODUCTS

| Example | 12 | 13 | 14 | 15 | 16 | 17 | 18 | 19 | 20 | 21 |
|---|---|---|---|---|---|---|---|---|---|---|
| Percent conversion of starting material to condensation product per batch | 34 | 36 | 58 | 38 | 31 | 57 | 53 | 59 | 77 | 55 |
| Active hydrogen, equivalent weight | 65.2 | 91.1 | 75.1 | 61.3 | 45.7 | 70.0 | 33.0 | 92.3 | 43.9 | 112.3 |
| Equivalent weight, amino plus phenoxyl groups | 114.7 | 130.0 | 119.6 | 111.9 | 84.5 | 110.3 | 115.2 | 140.9 | 60.1 | 113.9 |
| Ratio, aromatic amine residues per phenol residue | 2.49 | 0.542 | 1.14 | 3.15 | 1.35 | 1.16 | 1.09 | 0.964 | | 1.245 |
| Basic nitrogen, weight percent | 8.71 | 3.79 | 6.25 | 9.50 | | 6.83 | 6.35 | 4.88 | 10.92 | 6.82 |
| Total nitrogen, weight percent | 8.64 | 3.65 | 6.31 | 9.79 | 12.09 | 6.70 | 6.37 | 4.84 | 9.73 | 6.95 |
| Molecular weight of condensation product | 519 | 424 | 551 | 302 | 317 | 426 | 413 | 440 | | 425 |
| Average active hydrogen functionality | 8.2 | 5.0 | 7.6 | 4.9 | 7.3 | 6.0 | 5.7 | 4.8 | | 3.86 |

EXAMPLE 22

*Preparation of vicinal epoxide adduct of phenol-aromatic amine-formaldehyde condensation product*

Propylene oxide (1103 grams, 19.5 moles) was added to 1652 grams of the condensation product of Example 1. The addition was carried out by adding the propylene oxide to a stirred, fused batch of the condensation product which was maintained at 160° C. to 190° C. The addition took about 5 hours. At the end of this time, the addition of propylene oxide without catalyst had ceased, so 2.75 grams of potassium hydroxide was added to the reaction mixture, and 1833 more grams (31.6 moles) of propylene oxide was added to the reaction mixture. During the second addition of propylene oxide, which took about 8 hours, the reaction temperature was maintained at 130° C. to 180° C. After cooling, the polyol product was diluted with methanol to lower the viscosity, and was then passed through a column of strong acid ion-exchange resin to remove the potassium hydroxide catalyst. The pH of the eluate was 6.2. The product was stripped to a final temperature and absolute pressure of 180° C. and 3 millimeters of mercury. The polyol had a hydroxyl number of 306, which corresponds (according to the known active hydrogen equivalent weight of the original condensation product) to an average polyoxyalkylene chain length of 1.98 oxypropylene units.

EXAMPLES 23-42

Propylene oxide adducts were prepared from each of the condensation products prepared in Examples 3-21. The method of preparation was the same general procedure described in Example 22. Table IV tabulates the hydroxyl number and average length of oxyalkylene chains for each polyol.

TABLE IV.—DESCRIPTION OF PROPYLENE OXIDE ADDUCTS OF PHENOL-AROMATIC AMINE-FORMALDEHYDE CONDENSATION PRODUCTS

| Example | Example No. of condensation product | Hydroxyl number | Average length of oxyalkylene chain |
|---|---|---|---|
| 23 | 3 | 232 | 3.04 |
| 24 | 4 | 344 | 1.63 |
| 25 | 5 | 290 | 1.92 |
| 26 | 6 | 320 | 1.62 |
| 27 | 7 | 333 | 1.81 |
| 28 | 8 | 355 | 1.62 |
| 29 | 9 | 337 | 1.71 |
| 30 | 10 | 332 | 1.83 |
| 31 | 11 | 343 | 1.77 |
| 32 | 11 | 295 | 2.23 |
| 33 | 12 | 314 | 1.96 |
| 34 | 13 | 287 | 1.80 |
| 35 | 14 | 326 | 1.67 |
| 36 | 15 | 348 | 1.73 |
| 37 | 16 | 377 | 1.78 |
| 38 | 17 | 317 | 1.84 |
| 39 | 18 | 307 | 1.89 |
| 40 | 19 | 236 | 2.49 |
| 41 | 20 | 344 | 2.05 |
| 42 | 21 | 257 | 1.82 |

EXAMPLE 43

The ethylene oxide adduct of the phenol-aromatic amine-formaldehyde condensation product of Example 2 was prepared having an average oxyethylene chain length of 0.99. The method of preparation was by the same general procedure described in Example 22, except that no catalyst was used. The polyol product was then "capped" with propylene oxide to give a polyol that had a hydroxyl number of 375 and an average oxyalkylene chain length of 1.66 oxyalkylene units.

EXAMPLE 44

*Preparation of polyurethane foamed reaction product of the invention*

A foamed reaction product was prepared from the following formulation:

140 grams of the polyol prepared in Example 22
73.3 grams of an 80/20 mixture of 2,4- and 2,6-tolylene-diisocyanate
37 grams of trichloromonofluoromethane
1.2 grams of Silicone surfactant "L-520" [1]
0.8 gram of dibutyltin dilaurate catalyst

[1] A polydimethylsiloxane-polyoxyethyleneoxypropylene block copolymer prepared in accordance with the disclosure in U.S. Patent No. 2,834,748.

The foam was prepared by first blending the polyol with the trichloromonofluoromethane by charging both materials to a polyethylene bottle, sealing the bottle, and immersing it in a 55° C. water bath for 30 minutes. The bottle was then rolled on a mechanical roller overnight (about 16 hours). The desired amount of polyol-trichloromonofluoromethane blend was then weighed into a stainless-steel beaker. The catalyst and surfactant were added to the beaker, and the mixture was stirred with a mechanical mixer. The tolylene diisocyanate was then added, and the mixture was stirred vigorously until thoroughly mixed, after which it was immediately poured into an 8 x 8 x 5 inch waxed stainless steel mold which had been preheated to 70° C. After the foam had risen completely, it was cured for 10 minutes at 70° C., removed from the mold, and allowed to age for three days at room temperature before testing. The test results were as follows.

PROPERTIES OF FOAM SPECIMEN

Property:
    Cream time, sec. _____ 20
    Foam time, sec. _____ 65
    Tack time, sec. _____ 71
    Density, pounds/cubic foot _____ 2.1
    Percent closed cells _____ 91
Compressive strengths, p.s.i.:
    23° C., parallel to direction of foam rise ____ 48
    85° C., parallel to direction of foam rise ____ 35
    100° C., parallel to direction of foam rise ____ 33
    120° C., parallel to direction of foam rise ____ 12
    23° C., perpendicular to direction of foam rise _____ 19
    85° C., perpendicular to direction of foam rise _____ 17
    100° C., perpendicular to direction of foam rise _____ 14
    120° C., perpendicular to direction of foam rise _____ 6

PROPERTIES OF FOAM SPECIMEN—Continued

Property:
Percent change in volume at 100% relative humidity and 70° C. (humid aging):
 1 week _____ 10
 2 weeks _____ 10
 4 weeks _____ 12
Percent change in volume at 70° C. and 5% relative humidity (dry aging): 2 weeks _____ 3
Percent change in volume at −25° F. (cold aging):
 2 weeks _____ 0
Compression strength, p.s.i. (parallel to direction of foam rise):
 Humid aged 4 weeks _____ 41
 Dry aged 2 weeks _____ 53
 Cold aged 2 weeks _____ 50
Percent weight increase:
 Humid aged 1 week _____ 2
 Humid aged 2 weeks _____ 0
 Humid aged 4 weeks _____ 1
 Dry aged 2 weeks _____ 0
 Cold aged 2 weeks _____ 0
Water vapor permeability, parallel to foam rise, perm-inches _____ 2.24
$k$-Factor, parallel (B.t.u.) inches thickness (hours) (feet)$^2$ (° F.):
 Initial _____ 0.132
 30-day _____ 0.163
 60-day _____ 0.172
$k$-Factor, perpendicular:
 Initial _____ 0.109
 30-day _____ 0.126
 60-day _____ 0.140

EXAMPLES 45–63

By procedures analogous to that described in Example 44, a series of polyurethane foams were prepared from the polyols described in Examples 23–30 and 33–43. Table V below, details the formulation of each foam.

EXAMPLES 64–68

By procedures analogous to that described in Example 44, foams were prepared from the polyol described in Example 29 in combination with other polyols, which are described in Table VI. In each case, the total weight of the polyols employed was 140 grams. Table VI sets forth the formulation of each of the polyurethane foams.

TABLE VI.—FORMULATION OF POLYURETHANE FOAMS

| Example | Polyol Example No. | Additive polyol | Weight of additive polyol, grams |
|---|---|---|---|
| 64 | 29 | (¹) | 21.0 |
| 65 | 29 | 1,2,6-hexanetriol | 9.5 |
| 66 | 29 | Glycerine | 6.0 |
| 67 | 29 | Triisopropanolamine | 16.0 |
| 68 | 29 | (²) | 61 |

| Example | Weight of trichloromonofluoromethane | Weight of tolylene diisocyanate, grams | Weight of dibutyltin dilaurate, grams | Weight of surfactant L-520, grams |
|---|---|---|---|---|
| 64 | 35 | 88.7 | 0.3 | 1.2 |
| 65 | 35 | 91.3 | 1.2 | 1.2 |
| 66 | 35 | 91.3 | 1.2 | 1.2 |
| 67 | 35 | 91.3 | 1.2 | 1.2 |
| 68 | 35 | 91.3 | 1.2 | 1.2 |

¹ N,N,N′,N″N″-pentakis(2-hydroxypropyl)diethylenetriamine.
² The 1,2-epoxypropane adduct of a 95/5, by weight sorbitol/water mixture, said adduct having a hydroxyl number of 482.

EVALUATION OF EXAMPLES 45–68

Table VII displays various properties that were determined for the foams prepared in Examples 45–68. The test procedures were fully identified in Example 44 supra.

TABLE V.—FORMULATION OF POLYURETHANE FOAMS

| Example | Example No. of polyol | Weight of polyol, grams | Weight of tolylene diisocyanate | Weight of dibutyltin dilaurate | Weight of L-520 surfactant | Weight of trichloromonofluoromethane, grams |
|---|---|---|---|---|---|---|
| 45 | 23 | 150 | 59.5 | 1.3 | 1.3 | 34 |
| 46 | 24 | 140 | 78.8 | 0.6 | 1.2 | 40 |
| 47 | 25 | 140 | 66.3 | 0.8 | 1.2 | 38 |
| 48 | 26 | 140 | 73.2 | 0.8 | 1.2 | 42 |
| 49 | 27 | 140 | 76.2 | 1.2 | 1.2 | 42 |
| 50 | 28 | 140 | 84.9 | 1.2 | 1.2 | 40 |
| 51 | 29 | 140 | 76.8 | 0.6 | 1.2 | 40 |
| 52 | 30 | 140 | 77.7 | 0.6 | 1.2 | 40 |
| 53 | 33 | 140 | 71.8 | 1.2 | 1.2 | 40 |
| 54 | 34 | 140 | 65.4 | 1.2 | 1.2 | 40 |
| 55 | 35 | 140 | 74.4 | 1.2 | 1.2 | 44 |
| 56 | 36 | 140 | 79.3 | 1.2 | 1.2 | 40 |
| 57 | 37 | 140 | 85.6 | 0.8 | 1.2 | 40 |
| 58 | 38 | 140 | 72.5 | 1.2 | 1.2 | 35 |
| 59 | 39 | 140 | 69.8 | 1.2 | 1.2 | 35 |
| 60 | 40 | 140 | 54.0 | 1.2 | 1.2 | 45 |
| 61 | 41 | 140 | 78.6 | 1.2 | 1.2 | 35 |
| 62 | 42 | 143 | 60.0 | 1.2 | ¹ 1.2 | 39 |
| 63 | 43 | 70 | 42.7 | 0.4 | ² 0.6 | 18.5 |

¹ The surfactant employed in this example was Silicone L-530, which is a polydimethylsiloxane-polyoxyethyleneoxypropylene block copolymer of the non-hydrolyzable type.
² The surfactant employed in this example was Silicone L-521, which is a conventional polydimethylsiloxane-polyoxyethylene block copolymer.

TABLE VII.—FOAM PROPERTIES

| Example | Cream time, seconds | Foam time, seconds | Tack-free time, seconds | Density, lbs./cu. ft. | Percent closed cells | Dimensional stability, percent volume change after aging | | | | |
|---|---|---|---|---|---|---|---|---|---|---|
| | | | | | | Humid | | | Dry | Cold |
| | | | | | | 1 wk. | 2 wks. | 4 wks. | | |
| 45 | 17 | 60 | 95 | | | | | | | |
| 46 | 13 | 40 | 55 | 1.8 | 92 | 14 | 13 | 17 | | |
| 47 | 15 | 60 | 65 | 1.9 | 90 | 22 | 27 | 26 | 0 | 7 |
| 48 | 24 | 68 | 90 | 1.9 | 89 | 11 | 13 | 16 | 0 | 4 |
| 49 | 30 | 58 | 60 | 1.6 | 89 | 6 | 8 | 9 | 2 | 0 |
| 50 | 11 | 40 | 46 | 1.89 | 90.8 | 11 | 11 | 13 | 13 | 0 |
| 51 | 16 | 50 | 55 | 1.77 | 93.5 | 9 | 11 | 13 | 3 | 0 |
| 52 | 19 | 62 | 90 | 1.76 | 93.8 | 9 | 11 | 13 | 3 | 0 |
| 53 | 35 | 65 | 72 | 2.1 | 95 | 7 | 8 | 9 | 3 | 1 |
| 54 | 15 | 41 | 55 | 2.0 | 90 | 23 | 27 | 36 | 6 | 1 |
| 55 | 25 | 49 | 55 | 1.9 | 92 | 8 | 8 | 10 | 3 | −1 |
| 56 | 30 | 53 | 60 | 1.9 | 92 | 7 | 8 | 10 | 3 | 0 |
| 57 | 15 | 42 | 55 | 1.9 | 94 | 7 | 8 | 10 | 5 | 0 |
| 58 | 15 | 70 | 75 | 2.07 | | | | | | |
| 59 | 20 | 60 | 75 | 2.06 | | | | | | |
| 60 | 23 | 77 | 218 | 2.53 | | | | | | |
| 61 | 21 | 59 | 70 | 2.20 | | | | | | |
| 62 | 21 | 75 | 110 | | | | | | | |
| 63 | 50 | 70 | | 2.3 | | | | | | |
| 64 | 15 | 34 | 47 | 2.07 | 92.6 | 5 | 5 | 7 | 1 | 0 |
| 65 | 10 | 31 | 40 | 1.99 | 88.2 | 9 | 16 | 11 | 7 | 0 |
| 66 | 7 | 19 | 24 | 1.89 | 92.6 | 9 | 10 | 11 | 4 | 0 |
| 67 | 9 | 29 | 32 | 1.86 | 90.4 | 9 | 11 | 12 | 6 | 0 |
| 68 | 17 | 38 | 44 | 1.89 | 92.2 | 18 | 22 | 18 | 5 | −11 |

| Example | Weight stability, percent weight change after aging | | | | | Compressive strength, p.s.i. | | | | Compressive strength, p.s.i. | | |
|---|---|---|---|---|---|---|---|---|---|---|---|---|
| | Humid | | | Dry | Cold | 23° ∥ | 23° ⊥ | 85° ∥ | 85° ⊥ | Humid aged ∥ | Dry aged ∥ | Cold aged ∥ |
| | 1 wk. | 2 wks. | 4 wks. | | | | | | | | | |
| 45 | | | | | | | | | | | | |
| 46 | | | | | | 25 | | | | 24 | | |
| 47 | | | | | | 34 | 11 | 25 | 11 | 25 | 34 | 35 |
| 48 | | | | | | 37 | 13 | 30 | 13 | 34 | 40 | 37 |
| 49 | | | | | | 34 | 12 | 25 | 12 | 33 | 34 | 36 |
| 50 | 0 | −0.2 | 0 | −0.7 | −1.0 | 26.8 | 13.8 | 25.6 | 14.2 | 33.8 | 31.8 | 26.9 |
| 51 | 1.1 | 1.1 | 0.8 | 0.3 | 0 | 35.3 | 11.7 | 34.1 | 11.5 | 36.8 | 39.8 | 34.8 |
| 52 | 0.3 | 0 | −0.3 | −0.3 | −0.3 | 30.8 | 11.7 | 28.2 | 11.1 | 31.6 | 34.2 | 31.0 |
| 53 | | | | | | 42 | 17 | 33 | 17 | 44 | 52 | 42 |
| 54 | | | | | | 35 | 12 | 24 | 12 | 25 | 39 | 36 |
| 55 | | | | | | 39 | 13 | 34 | 15 | 37 | 44 | 36 |
| 56 | | | | | | 40 | 14 | 34 | 14 | 40 | 46 | 40 |
| 57 | | | | | | 39 | 13 | 33 | 13 | 39 | 41 | 40 |
| 58 | | | | | | | | | | | | |
| 59 | | | | | | | | | | | | |
| 60 | | | | | | | | | | | | |
| 61 | | | | | | | | | | | | |
| 62 | | | | | | | | | | | | |
| 63 | | | | | | | | | | | | |
| 64 | 0.5 | 0.5 | 0.2 | −0.2 | 0.0 | 45.0 | 18.6 | 40.9 | 15.8 | 46.8 | 48.4 | 48.2 |
| 65 | −1.7 | −2.4 | −1.9 | −1.4 | −4.7 | 23.9 | 12.5 | 20.8 | 14.6 | 37.8 | 28.0 | 22.9 |
| 66 | 0.7 | 0.5 | 0.2 | −0.5 | −1.0 | 27.8 | 11.9 | 27.8 | 14.8 | 30.8 | 34.2 | 25.3 |
| 67 | 0 | −0.3 | −0.5 | −1.0 | −3.0 | 22.6 | 12.3 | 22.2 | 14.0 | 29.0 | 26.6 | 21.3 |
| 68 | 0.2 | 0 | −0.5 | −0.7 | −3.7 | 24.9 | 12.7 | 20.3 | 12.9 | 26.5 | 27.2 | 24.5 |

EXAMPLES 69-78

By procedures analogous to that described in Example 1, the following phenol-aromatic amine-aldehyde condensation products are prepared (using the molar ratio of the reactants of 1/1/1):

| Example | Phenol | Aromatic amine | Aldehyde |
|---|---|---|---|
| 69 | o-Decylphenol | Aniline | Formaldehyde. |
| 70 | p-(N,N-dimethylamino) phenol. | 1,3-diaminobenzene. | Acetaldehyde. |
| 71 | Para-t-butylphenol. | 2,3-xylidine | Chloral. |
| 72 | Phenol | p-Butylaniline | Propionaldehyde. |
| 73 | 2,2-bis(p-hydroxyphenyl)propane. | Aniline | Formaldehyde. |
| 74 | Phenol | Beta-naphthylamine. | Do. |
| 75 | p-methoxyphenol | p-(N, N-dimethylamino) aniline | Chloral |
| 76 | Resorcinol | Aniline | Formaldehyde. |
| 77 | Beta-naphthol | o-Toluidine | Do. |
| 78 | o-Cresol | Aniline | Butyraldehyde. |

EXAMPLES 79—88

Following procedures analogous to that described in Example 22, the following vicinal epoxide adducts of the above-described phenol-aromatic amine-aldehyde are produced:

| Example | Example No. of condensation product | Vicinal epoxide |
|---|---|---|
| 79 | 69 | 1,2-epoxypropane. |
| 80 | 70 | Styrene oxide. |
| 81 | 71 | 1,2-epoxypropane. |
| 82 | 72 | Ethylene oxide. |
| 83 | 73 | 1,2-epoxypropane. |
| 84 | 74 | Phenyl glycidyl ether. |
| 85 | 75 | 1,2-epoxybutane. |
| 86 | 76 | 1,2-epoxypropane. |
| 87 | 77 | 1,2-epoxycyclohexane. |
| 88 | 78 | 1,2-epoxypropane. |

EXAMPLES 89–96

By the general procedure described in Example 44, the following polyurethane foamed reaction products are prepared from the polyols of Examples 79–88 and the below-identified organic polyisocyanates:

| Example | Example No. of polyol | Organic polyisocyanate |
|---|---|---|
| 89 | 79 | Tolylene diisocyanate. |
| 90 | 80 | Hexamethylene diisocyanate. |
| 91 | 81 | Tolylene diisocyanate. |
| 92 | 84 | Do. |
| 93 | 85 | Polymethylene polyphenylisocyanate. |
| 94 | 86 | Tolylene diisocyanate. |
| 95 | 87 | Polymethylene polyphenylisocyanate. |
| 96 | 88 | Tolylene diisocyanate. |

The preceding examples illustrate the practice of the invention. Variations can be made in accordance with the teachings of the instant specification without departing from the spirit and scope of the invention.

What is claimed is:

1. A composition which comprises the reaction product of an organic polyisocyanate and an alkylene oxide adduct of the condensation product of
   (a) a phenol of the formula

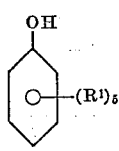

wherein each $R^1$ individually represents a member selected from the group consisting of hydrogen, alkyl, hydroxyl, amino, and dialkylamino, provided that at least one of the variables designated as $R^1$ represents a hydrogen that is bonded to a reactive position on the aromatic nucleus,
   (b) an aromatic amine of the formula

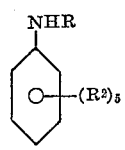

wherein R represents a member selected from the group consisting of hydrogen and alkyl, and wherein each $R^2$ individually represents a member selected from the group consisting of hydrogen, hydroxyl, amino, alkyl, and alkylamino, provided that at least one of the variables designated as $R^2$ represents a hydrogen that is bonded to a reactive position on the aromatic nucleus, and
   (c) formaldehyde.

2. A polyurethane foam which comprises the foamed reaction product of an organic polyisocyanate, a blowing agent and an alkylene oxide adduct of the condensation product of
   (a) a phenol of the formula

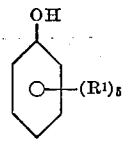

wherein each $R^1$ individually represents a member selected from the group consisting of hydrogen, alkyl, hydroxyl, amino, and dialkylamino, provided that at least one of the variables designated as $R^1$ represents a hydrogen that is bonded to a reactive position on the aromatic nucleus, (b) an aromatic amine of the formula

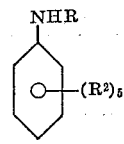

wherein R represents a member selected from the group consisting of hydrogen and alkyl, and wherein each $R^2$ individually represents a member selected from the group consisting of hydrogen, hydroxyl, amino, alkyl, and alkylamino, provided that at least one of the variables designated as $R^2$ represents a hydrogen that is bonded to a reactive position on the aromatic nucleus, and
   (c) formaldehyde.

3. A polyurethane foam which comprises the foamed reaction product of an organic polyisocyanate, a blowing agent, and polyol which comprises the alkylene oxide adduct of the condensation product of
   (a) phenol,
   (b) aniline, and
   (c) formaldehyde.

4. A polyurethane foam which comprises the foamed reaction product of an organic polyisocyanate, a blowing agent, and polyol which comprises the alkylene oxide adduct of the condensation product of
   (a) alkylphenol,
   (b) aniline, and
   (c) formaldehyde.

5. A polyurethane foam which comprises the foamed reaction product of an organic polyisocyanate, a blowing agent, and polyol which comprises the alkylene oxide adduct of the condensation product of
   (a) phenol,
   (b) alkyl-substituted aniline, and
   (c) formaldehyde.

6. A polyurethane foam which comprises the foamed reaction product of an organic polyisocyanate, a blowing agent, and polyol which comprises the alkylene oxide adduct of the condensation product of
   (a) para-aminophenol, and
   (b) formaldehyde.

7. A polyurethane foam which comprises the foamed reaction product of an organic polyisocyanate, a blowing agent, and polyol which comprises the alkylene oxide adduct of the condensation product of
   (a) phenol,
   (b) diaminotoluene, and
   (c) formaldehyde.

8. A polyurethane foam which comprises the foamed reaction product of an organic polyisocyanate, water, and an alkylene oxide adduct of the condensation product of
   (a) a phenol of the formula

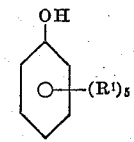

wherein each $R^1$ individually represents a member selected from the group consisting of hydrogen, alkyl, hydroxyl, amino, chloro, and dialkylamino, provided that at least one of the variables designated as $R^1$ represents a hydrogen that is bonded to a reactive position on the aromatic nucleus,
   (b) an aromatic amine of the formula

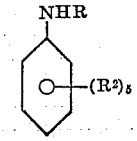

wherein R represents a member selected from the group consisting of hydrogen and alkyl, and wherein each $R^2$ individually represents a member selected from the group consisting of hydrogen, hydroxyl, amino, alkyl, and alkylamino, provided that at least one of the variables designated as $R^2$ represents a hydrogen that is bonded to a reactive position on the aromatic nucleus, and (c) formaldehyde.

9. A polyurethane foam which comprises the reaction product of an organic polyisocyanate, a blowing agent, and a polyol that comprises the mixed ethylene oxide/1,2-epoxypropane adduct of the condensation product of (a) phenol,
(b) aniline, and
(c) formaldehyde.

References Cited by the Examiner

UNITED STATES PATENTS

| | | | |
|---|---|---|---|
| 2,499,365 | 3/1950 | De Groote et al. | 260—59 |
| 3,075,927 | 1/1963 | Lanham | 260—2.5 |

LEON J. BERCOVITZ, *Primary Examiner.*